(12) United States Patent
Suzuki

(10) Patent No.: US 7,113,080 B2
(45) Date of Patent: Sep. 26, 2006

(54) INDICATOR FOR STRADDLE TYPE VEHICLE

(75) Inventor: Yasuhito Suzuki, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 39 days.

(21) Appl. No.: 10/814,812

(22) Filed: Mar. 31, 2004

(65) Prior Publication Data
US 2004/0221791 A1    Nov. 11, 2004

(30) Foreign Application Priority Data
Apr. 4, 2003    (JP) .............................. 2003-101170

(51) Int. Cl.
*B60Q 1/00* (2006.01)
(52) U.S. Cl. .................. 340/438; 340/461; 340/691.6; 340/815.4; 340/815.78; 362/23; 362/29; 362/489; 116/62.1; 116/290

(58) Field of Classification Search ................ 340/438, 340/461, 693.5, 691.6, 691.7, 815.4, 815.73, 340/815.78; 362/23, 26, 27, 30, 487, 489, 362/29; 116/286, 62.1, 288, 290
See application file for complete search history.

(56) References Cited

U.S. PATENT DOCUMENTS

| | | | |
|---|---|---|---|
| 6,302,551 B1 * | 10/2001 | Matumoto | .................... 362/27 |
| 6,516,678 B1 * | 2/2003 | Hamilton et al. | .......... 73/866.3 |
| 6,863,411 B1 * | 3/2005 | Furuya | ........................ 362/23 |
| 6,904,866 B1 * | 6/2005 | Furuya | ....................... 116/286 |

FOREIGN PATENT DOCUMENTS

| | | |
|---|---|---|
| JP | 05-30729 | 4/1993 |
| JP | 05-119163 | 5/1993 |
| JP | 08-14950 | 1/1996 |
| JP | 2700681 | 10/1997 |

* cited by examiner

*Primary Examiner*—Davetta W. Goins
(74) *Attorney, Agent, or Firm*—Hogan & Hartson LLP

(57) ABSTRACT

An indicator for a straddle type vehicle includes a dial plate and scale markings provided on the dial face. Each of the scale markings protrudes from a flat dial face of the dial plate and is provided with a slant face inclined relative to the flat dial face for reflecting external light.

17 Claims, 5 Drawing Sheets

(A)

(B)

(C)

(A)

(B)

(C)

INDICATOR FOR STRADDLE TYPE VEHICLE

BACKGROUND OF THE INVENTION

Field of the Invention

This invention relates to an indicator for a motorcycle, three-wheel vehicle, or other straddle type vehicle that operates with a driver straddling its seat.

In a typical speedometer, it is contemplated that letters, scales, and the like are marked on a dial plate by printing and a light is applied to the dial plate from the underside to improve visibility.

However, printed letters, scales, or the like are substantially of a planar shape like the dial plate, and it is difficult to improve the visibility particularly in the daytime. It is also difficult to obtain an appearance with full visual variety, and an improvement in visibility together with improved appearance cannot be expected.

On the other hand, there exists a dial plate of a speedometer formed with three-dimensional letters. A dial plate with three-dimensional letters on the top face of which is applied printing, and a dial plate with three-dimensional letters formed by an expanding ink also exists.

However, in the dial plates with the three-dimensional letters when printing is applied to the faces of letters, or the letters are formed by an expandable ink, the improvements in visibility and appearance can be limited.

On the other hand, a dial plate of a wristwatch formed with three-dimensional scale markings also exists. A wristwatch in which scale markings and the like are formed projecting on a dial plate and the dial plate irradiating from its back side is typically known.

However, each of the scale markings on the dial plate has a flat surface, so that the improvement in visibility and in appearance is also limited.

Also, a method of manufacturing a dial plate for a wristwatch formed with a three-dimensional scale marking is known. The dial plate is one in which a letter pattern is formed on a dial plate base, the letter pattern protrudes after application of plating and coating, the coating film is removed from the protruded upper surface to apply plating to an underlying metal, and a transparent color plastic layer is formed on the upper surface.

However, the dial plate is for a wristwatch and since the wristwatch is used while being worn on the users' wrist, it is designed such that good visibility is obtained when seen directly from the front. When it is difficult for the dial to be seen because of external light, it can easily be seen if the uses turn their arm a little.

On the other hand, an indicator for a motorcycle or the like has a large indication area compared with the wristwatch. There is therefore a burning need for the improvement in visibility. The scale markings of a wristwatch, if adopted in the motorcycle, is not sufficient in the improvements in visibility and in the quality of the external appearance. So the technology connected with the wristwatch cannot be applied to a motorcycle without being modified.

In view of the foregoing, an advantage of the present invention is to provide an indicator for a straddle type vehicle such as a motorcycle having sufficient visibility even in a case where external light is great, and having a higher quality of external appearance.

SUMMARY OF THE INVENTION

To achieve the foregoing advantage, this invention provides an indicator for a straddle type vehicle. An indicator for a straddle type vehicle having a dial plate with scale markings, wherein each of the scale markings protrudes from the flat dial face of the dial plate and provided with a slant face inclined relative to the flat dial face for reflecting external is disclosed.

According to this embodiment of the present invention, the scale markings are configured such that they protrude from the dial plate for prominence and external light is reflected for further prominence without the need of increasing its height and size. Therefore, the visibility is improved to a large extent, and the external appearance with full variety can be affected by the reflection of external light. This improves the quality in the external appearance.

In a preferred embodiment of the present invention, each scale marking is provided with two slant faces inclined in opposite directions to each other and a ridgeline is formed between the two slant faces.

According to this embodiment of the present invention with a central ridgeline placed in-between, there are provided on both sides, two slant faces inclined in opposite directions. Therefore, a sharp contrast of reflected light from the two slant faces is produced without the need of increasing the height and shape of the scale markings, improving visibility and the quality of the external appearance.

In a preferred embodiment, each of the scale markings is provided with at least two slant faces and a top face connecting the upper edges of the at least two slant faces.

A top face is formed between two slant faces and the width of the top face is smaller than its height. Therefore, a variety of reflected light from the slant faces on both sides and the top face is increased without the need of increasing the height and shape of the scale markings, thus improving the quality of the external appearance as well as the visibility.

In a preferred embodiment, the slant face is a curved surface bulging outwardly.

According to an embodiment of the present invention, external light beams of different angles are reflected beautifully with full variety, improving the quality of the external appearance as well as the visibility.

In a preferred embodiment, each of the scale markings has an upright projecting portion and an upper portion having the slant faces. The upper portion is formed onto the upper end of the upright projecting portion.

The scale markings having a small size is made prominent, improving visibility and the quality of the external appearance.

In a preferred embodiment, the ridgeline or the top face is inclined in the longitudinal direction of the scale markings.

According to an embodiment of the present invention, not only the slant faces but the upper edges of the slant faces, that is, the ridgelines of the scale markings, or the top face between the slant faces is also inclined. Therefore, solidity is intensified, which improves the quality of the external appearance as well as the visibility.

In a preferred embodiment, the skirt portion of the slant faces is in the general shape of a streamline in plan view.

According to an embodiment of the present invention, improvements in visibility and in the quality of the external appearance can be made without the need of increasing the height and the shape of the scale markings.

In a preferred embodiment, the skirt portions of the slant faces are in the general shape of a wedge in plan view. Also, improvements in visibility and in the quality of the external appearance can be made without the need of increasing the height and shape of the scale markings.

In a preferred embodiment, the flat dial face is formed to allow for passage of light from behind the dial plate and the scale markings are formed to block off light from behind the dial plate.

According to an embodiment of the present invention, because of the slant faces of the scale markings, external light is reflected in the daytime for improvements in visibility and in the quality of the external appearance. Also, at night, because of the dial plate being irradiated from the underside, the scale markings block off light, which allows the passage of light through the flat dial face around the scale markings. Therefore, the region around the scale markings is brightened, improving visibility and the quality of the external appearance.

In a preferred embodiment, a plurality of dirrerent kinds of scale markings having different levels of reflectivity are provided.

According to an embodiment of the present invention, a plurality of different kinds of scale markings of different levels of reflectivity are provided. Therefore improvements in visibility and in the quality of the external appearance are made due to reflected light from the slant faces of the scale markings. A variety in external appearances due to the reflection is also increased for a further improvement in the quality of the external appearance.

DETAILED DESCRIPTION OF THE PREFERRED EMBODIMENTS

Figure 1:
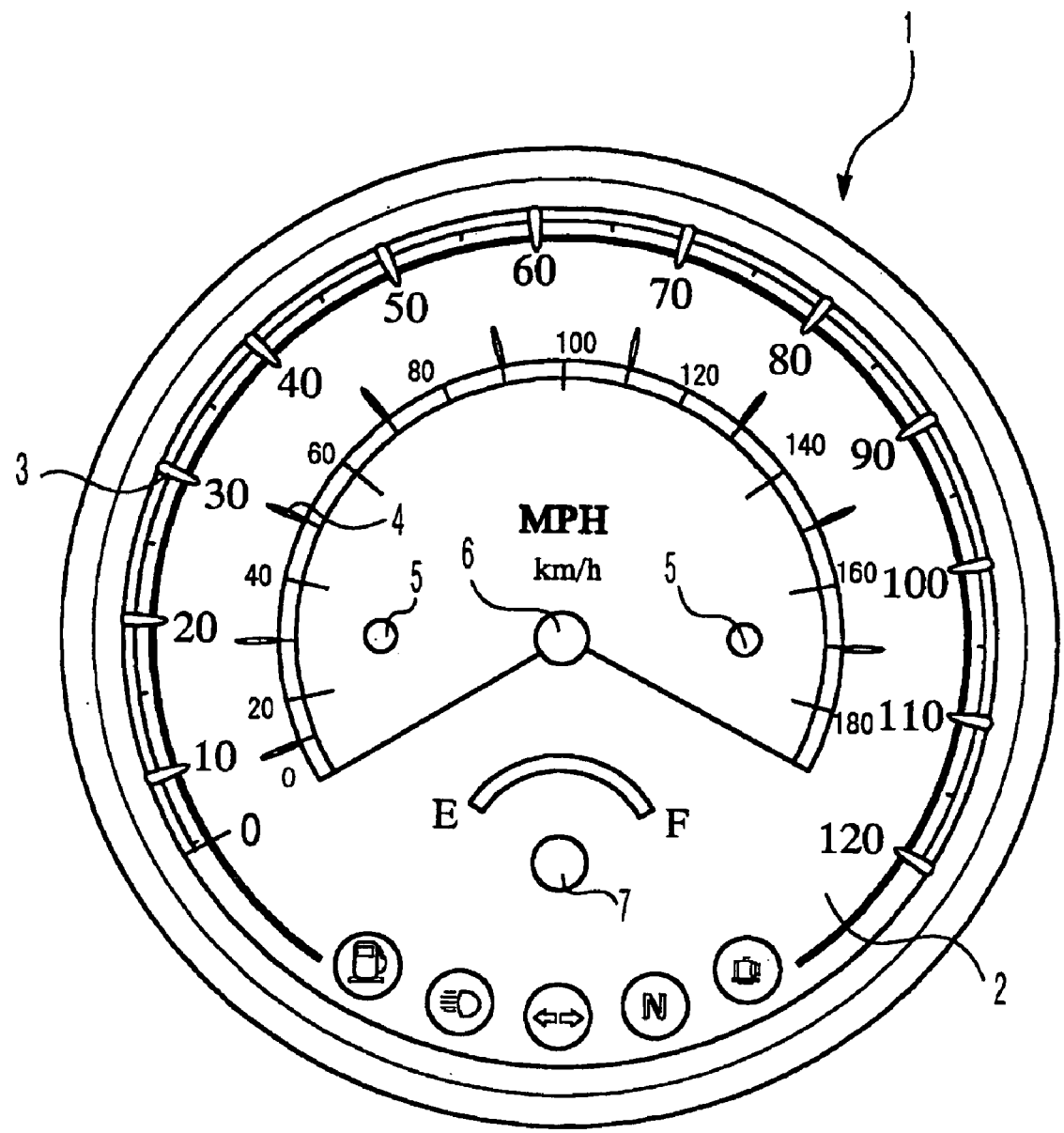
FIG. 1 is an external view of a speedometer according to an embodiment of this invention.

FIG. 1 is an external view of a speedometer according to an embodiment of the present invention.

The speedometer 1 of a circular shape is formed, on a dial plate 2 consisting of a flat dial face, with a main scale 3 along an arc of the peripheral edge and a sub-scale 4 in the inner side of the main scale 3. Numeral 5 designates a mounting hole of the dial plate, numeral 6 a hole for a speed pointer (not shown), and numeral 7 a hole for a fuel pointer (not shown). The main scale 3 and the sub-scale 4 protrude from the dial plate 2 of a flat dial face and have slant faces for reflecting external light as described later. The sub-scale 4 is smaller in shape than the main scale 3. The main scale 3 and the sub-scale 4 are preferably differentiated from each other by changing their reflectivity through the use of different kinds of metallic materials, or the like.

Figure 2:
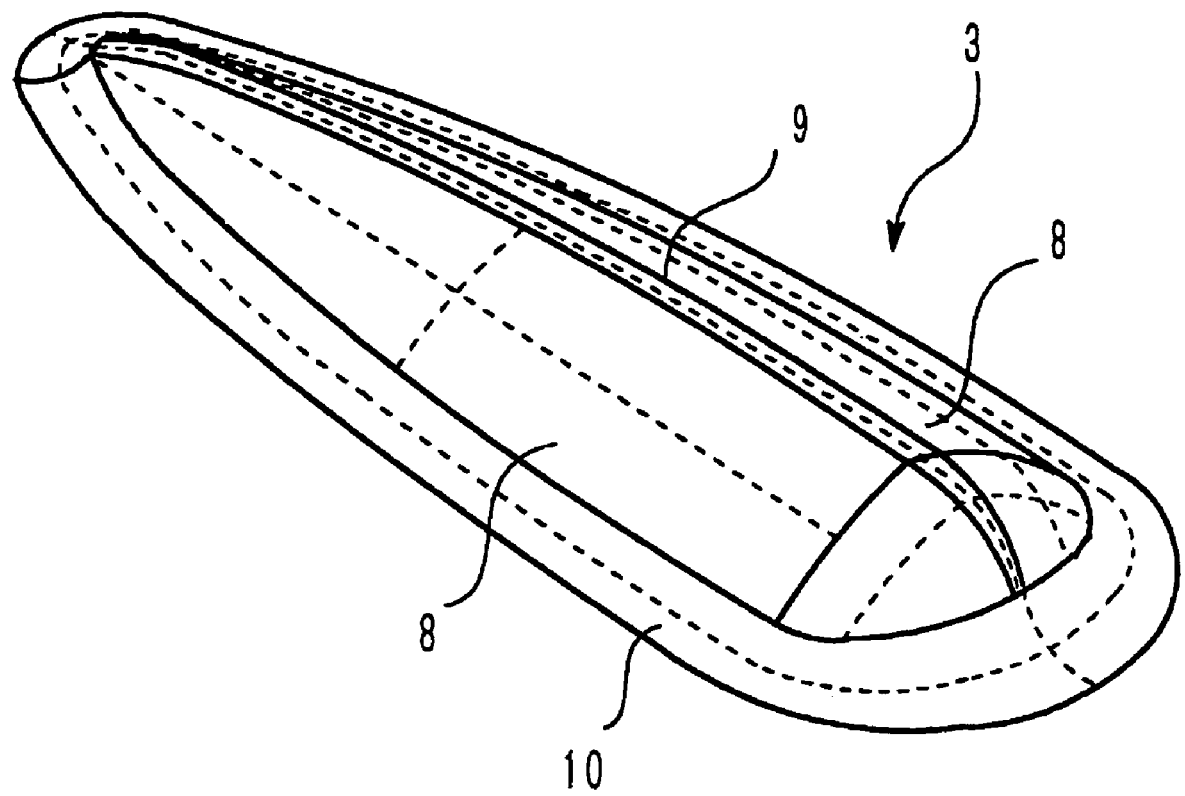
FIG. 2 is a perspective view of a scale according to an embodiment of the present invention.
Figure 3:
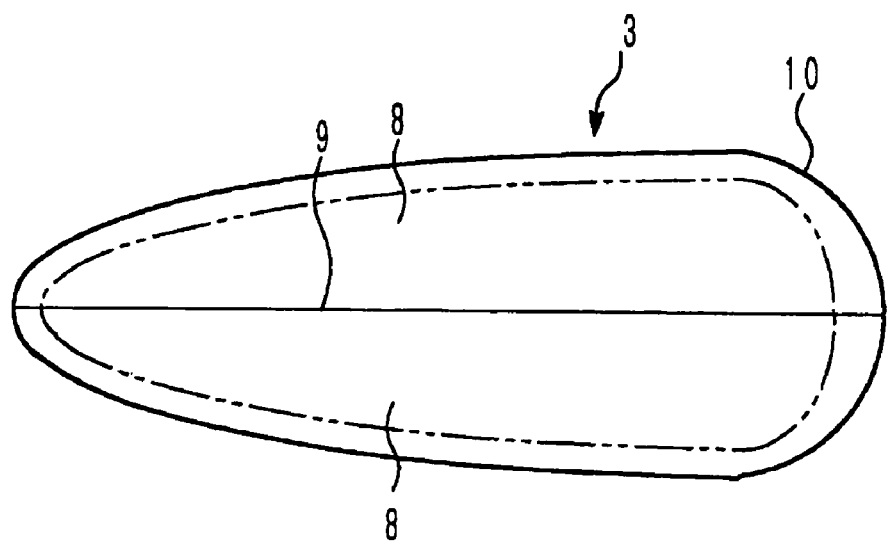
FIGS. 3(A)–3(C) are illustrations of the shape of the scale of FIG. 2.
Figure 3:
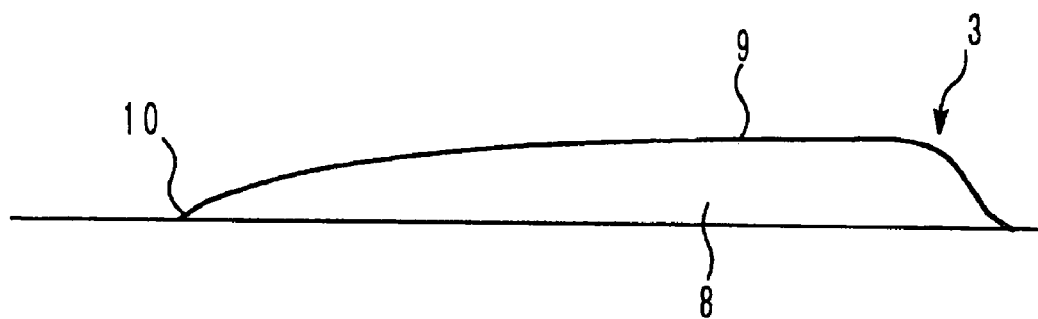
Figure 3:
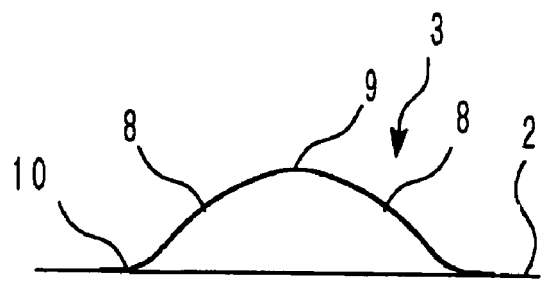

FIG. 2 is a perspective view of a scale according to an embodiment of the present invention, and FIGS. 3(A)–(C) are plan, side, and front views, respectively, of the scale corresponding to FIG. 2. This embodiment shows the main scale 3 of FIG. 1.

As described above, the main scale 3 protrudes from the dial plate and has two slant faces 8 inclined in opposite directions from a center line toward both sides to form a mountain-like configuration such that a ridgeline 9 is formed in the longitudinal direction. The skirt portion 10 of each slant face 8 of the main scale 3 is in the shape of approximately a streamline. The ridgeline 9 is also inclined gently. The ridgeline 9 and the slant faces 8 are each inclined into a convex curve or a convex curved surface such that they bulge somewhat outwardly. The shape of the skirt portion 10 is not limited to a streamline but may be other curves or a straight line. For example, the skirt portions 10 on both sides may be formed assuming a wedge-like shape.

Figure 4:
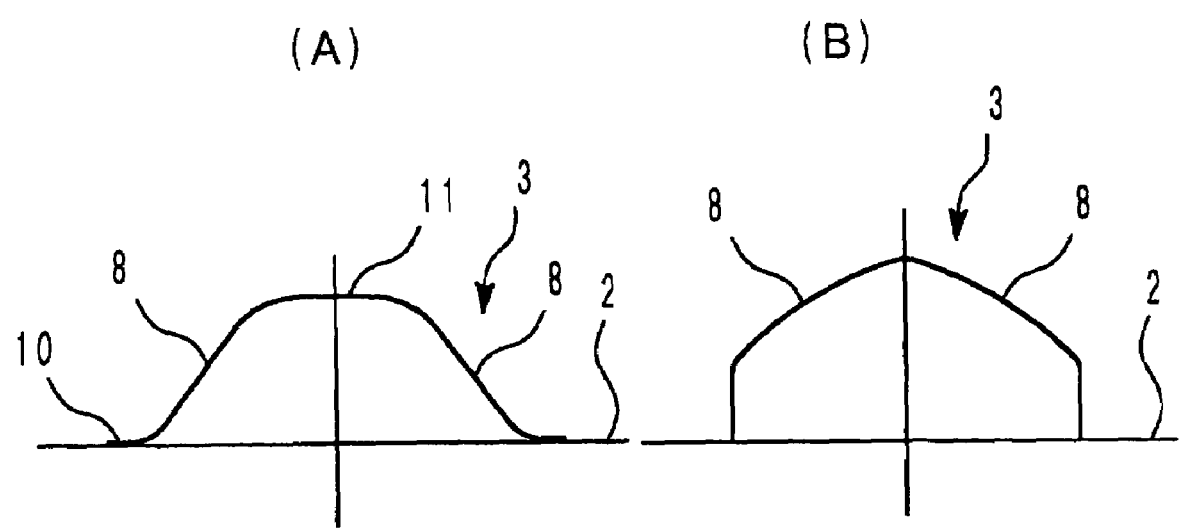
FIGS. 4(A) and 4(B) are illustrations of the shape of other embodiments of the present invention.

FIGS. 4(A) and 4(B) are front views of other embodiments of the present invention corresponding to FIG. 3(C).

In the example of FIG. 4(A), at the upper edges of the slant faces 8 on both sides is formed a top face 11 connecting the two slant faces together. It is preferable that this top face 11 is inclined gently, like the ridgeline 9 of FIG. 3(B). The width of the top face 11 is narrower than the height from the dial face of the dial plate 2.

In the example of FIG. 4(B), the scale 3 rises directly from the dial plate 2 to protrude, and slant faces 8 are formed thereabove.

Figure 5:
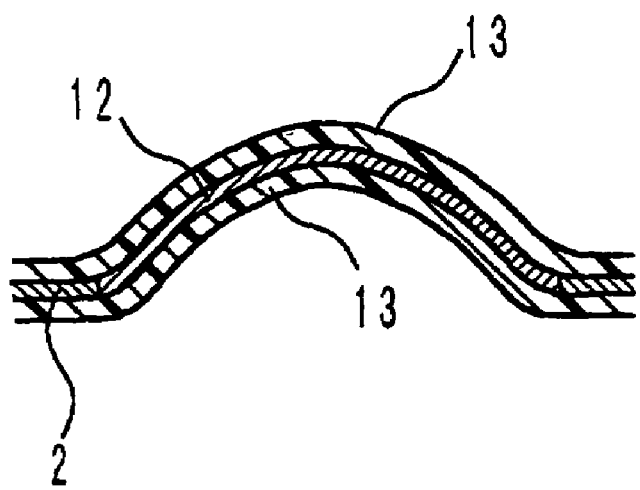
FIGS. 5(A)–5(C) are illustrations of the construction of the cross-section of scales according to embodiment of the present invention.
Figure 5:
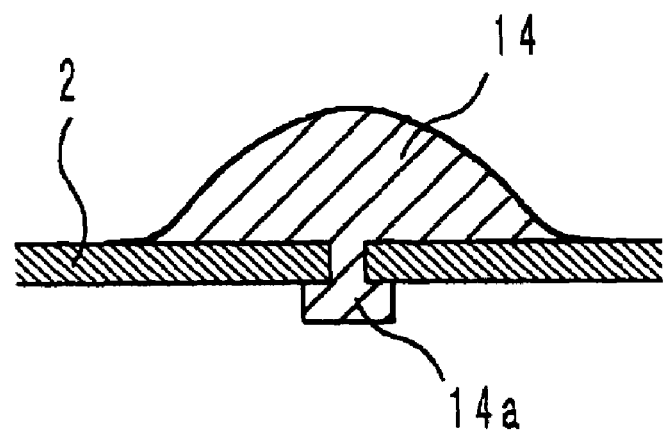
Figure 5:
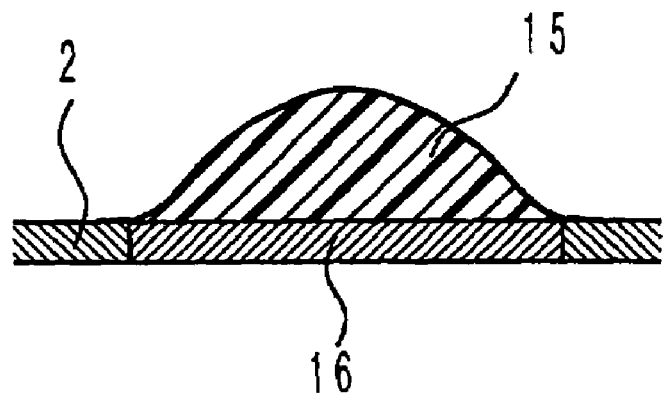

FIGS. 5(A)–5(C) are illustrations of the construction of the cross-section of scale markings according to an embodiment of the present ivention.

FIG. 5(A) shows a dial plate 2 made from a plastic material on which is mounted a scale 12 made from a metallic material or a plastic material coated with metal by metal deposition. The face and the back of the scale 12 are covered entirely by transparent layers 13. The transparent layer 13 is made of a plastic film such as acrylic resin or a grass film such as glass.

It is preferable that the dial plate 2 is formed, for example, from a transparent or a semi-transparent plastic material for the passage of light. On the contrary, the scale 12 is formed, for example, from a metallic material or a transparent material the same as that of the dial plate to which is applied a metal deposition, plating or coating, for the blockage of light.

If a light source is provided at the back of the dial plate 2 to irradiate it, light is blocked off by the non-transparent scale 12, so that contrast with the surrounding area becomes clear, which raises visibility. One or both of the front and rear transparent plastic films 13 may be eliminated.

FIG. 5(B) shows a scale 14 formed by a metallic or plastic block, with an inserting piece 14a fitted in the dial plate 2.

FIG. 5(C) shows a reflecting metal plate 16 bonded to a scale section of the dial plate 2, on which is formed a transparent projection 15. The dial plate 2 may also be covered by the same transparent material as the transparent projection 15.

In the foregoing embodiments, the shape of the scale markings, the angle and the protruded height of slant faces, the color or the kind of metallic materials or transparent layers, or the like changes to thereby change the reflectivity to external light, providing a desired effect of reflective visibility.

Such three-dimensional scales can be manufactured by machining, plating, or other various known methods.

In this invention as described above, each of the scale markings is configured such that it protrudes from the dial plate for prominence and external light is reflected for further prominence without the need of increasing its height and size. Therefore, visibility is improved to a large extent, and the external appearance with full variety can be made by the reflection of external light, improving the quality in the external appearance.

In addition, in an embodiment in which each scale marking is provided with two slant faces inclined in opposite directions to each other and a ridgeline formed between the two slant faces, with a central ridgeline placed in-between, there are provided on both sides two slant faces inclined in opposite directions. Therefore, a sharp contrast of reflected light from the two slant faces is produced without the need of increasing the height and shape of the scale markings. This improves visibility and the quality of the external appearance.

Further, in another arrangement in which the scale markings are provided with at least two slant faces and a top face connecting the upper edges of these slant faces, and the width of the top face is formed smaller than the height of the top face from the flat dial face, a top face is formed between two slant faces and the width of the top face is smaller than its height. Therefore, a variety of reflected light from the slant faces on both sides and the top face is increased without the need of increasing the height and shape of the scale markings. This also improves the quality of the external appearance as well as the visibility.

Further, in another embodiment in which the slant face is a curved surface bulging outwardly, external light beams of different angles are reflected beautifully with full variety, improving the quality of the external appearance as well as the visibility.

Furthermore, in another embodiment in which the scale markings rise upright from the flat dial face and the slant faces are formed thereabove, the scale marking of a small shape is made prominent. This improves visibility and the quality of the external appearance.

Furthermore, in another embodiment in which the ridgeline or the top face is inclined, not only the slant faces but the upper edges of the slant faces, that is, the ridgelines of the scale markings, or the top face between the slant faces is also inclined. Therefore solidity is intensified, which improves the quality of the external appearance as well as the visibility.

Still further, in still another embodiment in which the skirt portions of the slant faces are in the general shape of a streamline in plan view, improvements in visibility and in the quality of the external appearance can be made without the need of increasing the height and shape of the scale markings.

Still further, in still another embodiment in which the skirt portions of the slant faces are in the general shape of a wedge in plan view, improvements in visibility and in the quality of the external appearance can be made without the need of increasing the height and shape of the scale markings.

Yet further, in yet another embodiment in which the flat dial face is formed to allow passage of light and the scale markings are formed to block off the light, because of the slant faces of the scale markings, external light is reflected in the daytime for improvements in visibility and in the quality of the external appearance, and also at night, because of the dial plate being irradiated from the underside, the scale markings block off light, which allows the passage of light through the flat dial face around the scale markings. Therefore, the region around the scale markings is brightened, which improves visibility and the quality of the external appearance.

Yet further, in yet another embodiment in which a plurality of scales of different levels of reflectivity are provided, a plurality of scale markings of different levels of reflectivity are provided. Therefore, improvements in visibility and in the quality of the external appearance are made due to reflected light from the slant faces of scale markings, and a variety in the external appearance due to the reflection is also increased for a further improvement in the quality of the external appearance.

What is claimed is:

1. An indicator for a straddle type vehicle, comprising:
   a dial plate; and
   scale markings provided on the dial face,
   wherein each of the scale markings protrudes from a flat dial face of the dial plate and is provided with two slant faces inclined relative to the flat dial face for reflecting external light and inclined in opposite directions to each other and a ridgeline formed between the two slant faces.

2. An indicator for a straddle type vehicle, comprising:
   a dial plate; and
   scale markings provided on the dial face,
   wherein each of the scale markings protrudes from a flat dial face of the dial plate and is provided with at least two slant faces inclined relative to the flat dial face for reflecting external light and a top face connecting upper edges of the at least two slant faces, and a width of the top face is formed to be smaller than a height of the top face from the flat dial face.

3. The indicator for a straddle type vehicle according to claim 1, wherein each slant face is a curved surface which bulges outwardly.

4. The indicator for a straddle type vehicle according to claim 1 wherein each of the scale markings has an upright projecting portion and an upper portion having the slant faces, the upper portion being formed onto an upper end of the upright projecting portion.

5. The indicator for a straddle type vehicle according to claim 2, wherein a ridgeline or the top face is inclined in a longitudinal direction of the scale markings.

6. An indicator for a straddle type vehicle, comprising:
   a dial plate; and
   scale markings provided on the dial face,
   wherein each of the scale markings protrudes from a flat dial face of the dial plate and is provided with a slant face inclined relative to the flat dial face for reflecting external light, and
   wherein a skirt portion of each slant face has a general shape of a streamline in plan view.

7. An indicator for a straddle type vehicle comprising:
   a dial plate; and
   scale markings provided on the dial face,
   wherein each of the scale markings protrudes from a flat dial face of the dial plate and is provided with a slant face inclined relative to the flat dial face for reflecting external light, and
   wherein a skirt portion of each slant face has a general shape of a wedge in plan view.

8. The indicator for a straddle type vehicle according to claim 1 wherein the flat dial face is formed to allow for passage of light from behind the dial plate and the scale markings are formed to block off light from behind the dial plate.

9. The indicator for a straddle type vehicle according to claim 1, wherein a plurality of scale markings having different levels of reflectivity are provided.

10. An indicator for a straddle type vehicle, comprising:
    a dial plate; and
    means for reflecting external light provided on the dial face, wherein the means for reflecting protrudes from a flat dial face of the dial plate and is provided with two slant faces inclined relative to the flat dial face and inclined in opposite directions to each other and a ridgeline formed between the two slant faces.

11. An indicator for a straddle type vehicle, comprising:
a dial plate; and
means for reflecting external light provided on the dial face,
wherein the means for reflecting protrudes from a flat dial face of the dial plate and is provided with at least two slant faces inclined relative to the flat dial face and a top face connecting upper edges of the at least two slant faces, and a width of the top face is formed to be smaller than a height of the top face from the flat dial face.

12. The indicator for a straddle type vehicle according to claim 10, wherein each slant face is a curved surface which bulges outwardly.

13. The indicator for a straddle type vehicle according to claim 10, wherein the means for reflecting has an upright projecting portion and an upper portion having the slant faces, the upper portion being formed onto an upper end of the upright projecting portion.

14. The indicator for a straddle type vehicle according to claim 11, wherein a ridgeline or the top face is inclined in a longitudinal direction of the means for reflecting.

15. An indicator for a straddle type vehicle, comprising:
a dial plate; and
means for reflecting external light provided on the dial face,
wherein the means for reflecting protrudes from a flat dial face of the dial elate and is provided with a slant face inclined relative to the flat dial face, and
wherein a skirt portion of each slant face has a general shape of a streamline in plan view.

16. An indicator for a straddle type vehicle, comprising:
a dial plate; and
means for reflecting external light provided on the dial face,
wherein the means for reflecting protrudes from a flat dial face of the dial plate and is provided with a slant face inclined relative to the flat dial face, and
wherein a skirt portion of each slant face has a general shape of a wedge in plan view.

17. The indicator for a straddle type vehicle according to claim 10, wherein the flat dial face is formed to allow for passage of light from behind the dial plate and the means for reflecting are formed to block off light from behind the dial plate.

* * * * *